Sept. 7, 1948.  J. ROBERTS  2,448,913
VALVE
Filed Dec. 28, 1945

INVENTOR.
John Roberts
BY
C. L. Drew
Att'y

Patented Sept. 7, 1948

2,448,913

UNITED STATES PATENT OFFICE 2,448,913

VALVE

John Roberts, San Francisco, Calif.

Application December 28, 1945, Serial No. 637,551

1 Claim. (Cl. 251—54)

This invention relates to improvements in valves and has particular reference to a sliding wedge valve which is particularly adaptable for use with high pressures.

The principal object of this invention is to produce a valve which will seal off high pressures, effecting the seal with a minimum amount of effort.

A further object is to provide a valve arrangement wherein the valve is maintained against its seat through the medium of a solid backing in contradistinction to the use of an ordinary, relatively frail and flexible valve stem.

A further object is to produce a valve which will occupy a minimum amount of space in contradistinction to large, heavy, cumbersome high pressure valves.

A still further object is to produce a valve which is economical to manufacture, simple to assemble and not subject to excessive wear.

A further object is to produce a valve which can control the flow therethrough in either direction.

Other objects and advantages will be apparent during the course of the following description.

Figure 1:
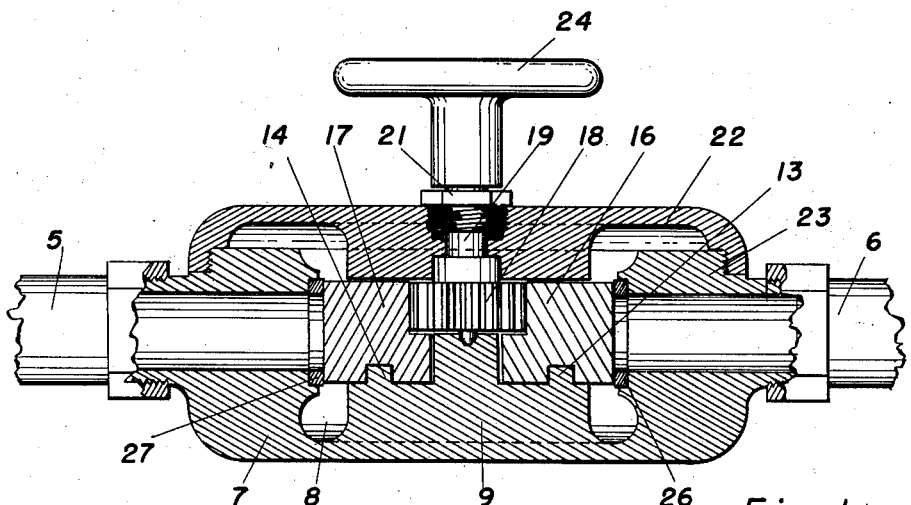
Figure 2:
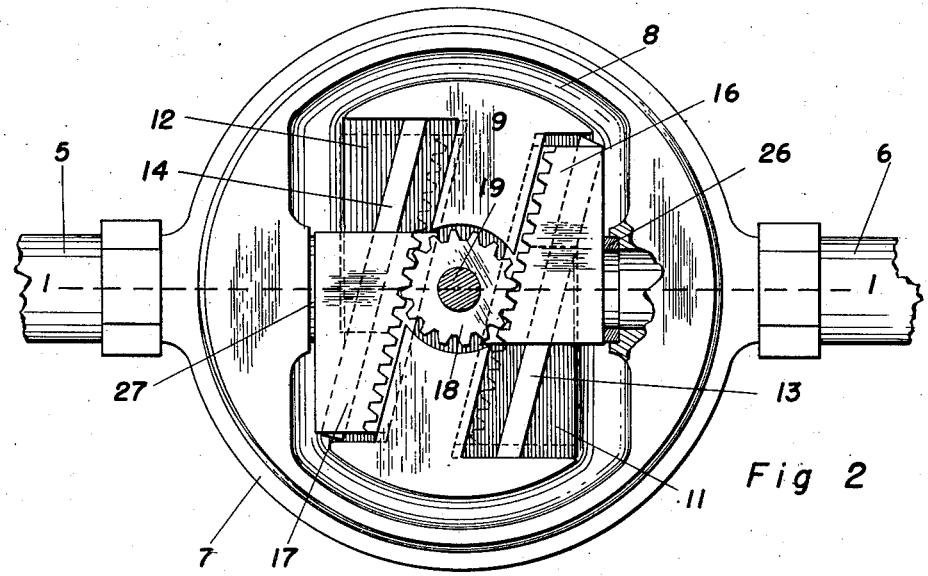

In the accompanying drawings forming a part of this specification and in which like numerals are employed to designate like parts throughout the same, Fig. 1 is a cross-sectional view taken on the line 1—1 of Fig. 2, and showing portions thereof in elevation.

Fig. 2 is a top plan view of Fig. 1 with the cover removed to expose the valve mechanism.

Valves which control the flow of liquids under pressure are usually provided with a seat, and a valve which is carried on the end of a valve stem, which valve is brought against the seat with a rotary motion, the result being that the valve rapidly wears, and due to the flexibility of the valve-stem the valve does not always seat correctly, and consequently there is leakage.

These types of valves also are exceedingly cumbersome and are hard to install in confined spaces; also, the valves must be correctly installed, as they act to control the flow of liquid in one direction only.

I have, therefore, devised a valve which utilizes one or more sliding wedges which are forcibly brought into engagement with the valve seat and with a backing member, so that there is direct pressure downwardly against the valve-seat, and also a sliding motion of the valve on the valve-seat.

The result of this construction is that there is an absolute seal under heavy pressure, and the sliding motion tends to effect a polishing of the valve seat so as to maintain the same in sealing condition.

In the accompanying drawings wherein for the purpose of illustration is shown a preferred embodiment of my invention, the numerals 5 and 6 refer to two pipes between which my valve is to be connected. Either of the pipes can be the inlet pipe or outlet pipe, it being immaterial, as the valve actuates control of flow in either direction.

At 7 I have shown a valve casting in which is formed a channel 8 which surrounds an upstanding island 9, within which valve recesses 11 and 12 are formed. Also, in these recesses are inclined guides 13 and 14 respectively, which serve to slidably support the wedge-shaped valves 16 and 17 respectively. Each of these valves is provided upon its adjacent surface with teeth which are in turn adapted to mesh with a gear 18 mounted upon a valve stem 19 which extends upwardly through a stuffing gland 21 mounted in the valve cover 22, threadedly secured to the casting 7, as shown at 23.

A handle 24 is secured to the valve stem 19, whereby the same may be rotated for the purpose of rotating the gear 18. The valves 16 and 17 are adapted to abut valve-seats 26 and 27 respectively.

The result of this construction is that when the handle 24 is rotated in a counter-clockwise direction, the gear 18 will slide the valves 16 and 17 on their guides 13 and 14, thus moving the valve into intimate engagement with the valve-seats 26 and 27, as shown in full lines in Fig. 2.

It will be apparent that this wedging action can exert tremendous pressure against the valve-seats, and at the same time a rubbing pressure on the valve-seats, which tends to keep them clean. Also, it will be noted that there is solid metal extending from one valve-seat to the other, as through the valves backed up by the connecting interposed gear.

When the handle 24 is rotated in a clockwise direction the rotation of the gear 18 will move the valves toward their dotted line position of Fig. 2, or away from the valve-seats, and consequently any liquid in the pipe 5 can flow through to the pipe 6 or vice versa, depending upon the direction of the flow of the liquid.

It is also apparent that this wedging action in overcoming high pressures will be very easy to operate and the pressure may be very accurately controlled in accordance with the desires of the operator.

The result of this construction is that I have provided a valve arrangement wherein the wedge-shaped valve is tightly forced against its valve-seat in a simple and efficient manner.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a valve of the character described, a casing, opposed inlet and outlet valve seats formed in said casing, a pair of wedge-shaped valves slidably mounted in said casing, inclined guides formed in said casing and inclined with respect to said valve seats whereby when said valves are moved on said guides said valves will be moved toward or away from said seats, and means for moving said valves simultaneously, said means comprising a rotatable member positioned between said valves and in the same plane as the axis of said valve seats and having driving engagement with said valves to transmit simultaneous movement to each of said valves.

JOHN ROBERTS.

REFERENCES CITED

The following references are of record in the file of this patent:

UNITED STATES PATENTS

| Number | Name | Date |
|---|---|---|
| 535,766 | Meadowcraft | Mar. 12, 1895 |
| 2,235,612 | Graney | Mar. 18, 1941 |